UNITED STATES PATENT OFFICE.

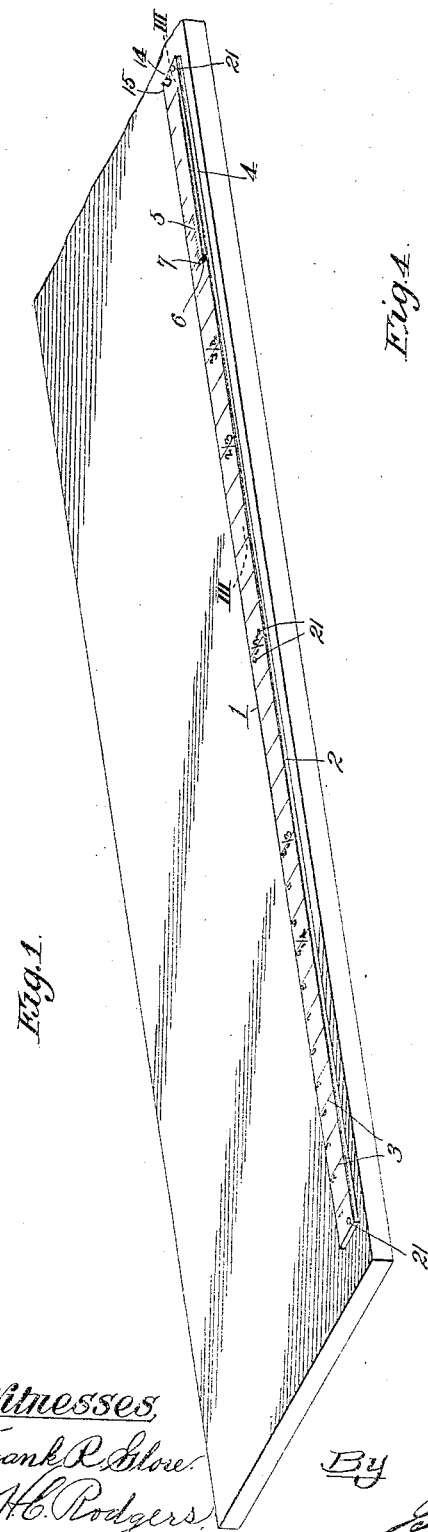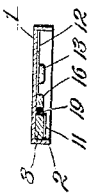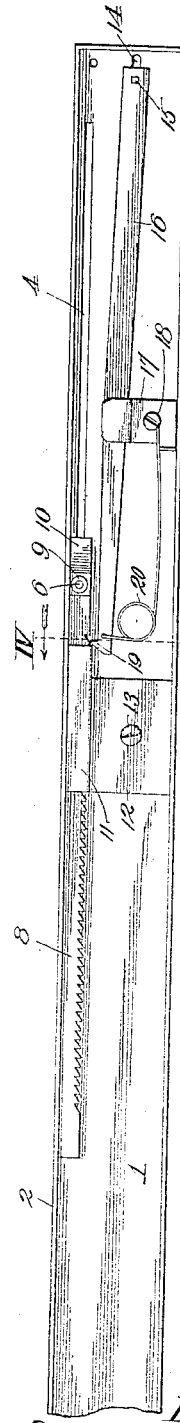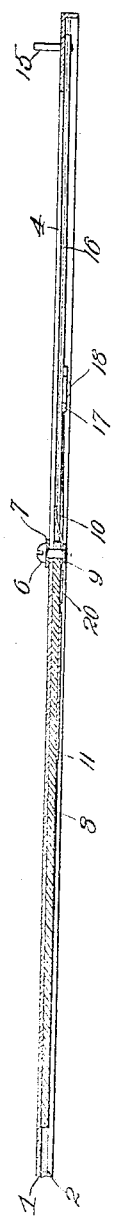

JOHN BARRY AND MICHEAL L. SHAUGHNESSY, OF WESTPHALIA, KANSAS.

COMBINED MEASURING AND REGISTERING DEVICE.

No. 818,405.  Specification of Letters Patent.  Patented April 24, 1906.

Application filed May 29, 1905. Serial No. 262,941.

*To all whom it may concern:*

Be it known that we, JOHN BARRY and MICHEAL L. SHAUGHNESSY, citizens of the United States, residing at Westphalia, in the county of Anderson and State of Kansas, have invented certain new and useful Improvements in a Combined Measuring and Registering Device, of which the following is a specification.

Our invention relates to combined measuring and registering devices, and more particularly to a device for use in dry-goods stores as a reliable guide in measuring off any number of yards of cloth and for registering such number of yards, so that the person taking the measurement may by consulting the register ascertain just how many yards have been measured.

Our object is to produce a device of the character outlined which registers the yards accurately and reliably, which can be operated with the same movement necessary in measuring a yard by the ordinary means, which can be easily and quickly secured in or removed from position on the counter, which does not interfere with the use of the counter for the usual purposes, and which can be manufactured cheaply.

To these ends the invention consists in certain novel and peculiar features of construction and organization, as hereinafter described and claimed, and in order that it may be fully understood reference is to be had to the accompanying drawings, in which—

Figure 1 is a perspective view of a portion of a counter equipped with a combined measuring and registering device embodying our invention. Fig. 2 is an inverted plan view of a portion of the device on a larger scale than Fig. 1. Fig. 3 is a vertical longitudinal section taken on the line III III of Fig. 1. Fig. 4 is a section on the line IV IV of Fig. 2.

In the said drawings, 1 indicates what may be termed a "yardstick" or "plate," the same being preferably formed of thin sheet metal provided at each margin with a depending flange 2. Said yardstick or plate is preferably made in two sections of equal length in order that it may be more conveniently and with less chance of injury sent through the mail or by express. On its upper side said yardstick or plate is provided with transverse scores 3, so as to divide the plate into inch spaces marked "1, 2, 3," &c., up to and including "36." Each inch space may be subdivided, if desired. The face of the yardstick or plate will at the proper intervals bear the inscriptions "1/4," "1/3," "1/2," "2/3," and "3/4" to facilitate measuring off such fractions of a yard of goods.

Near its right-hand and inner margin the plate is provided with a longitudinal slot 4 and contiguous thereto with division-marks 5, dividing said slot into fifty equal parts or any other desired number of parts, fifty being sufficient for ordinary use, and extending through said slot so as to slide therein is a screw 6, an index-finger 7 being secured on the screw between its head and the face of the yardstick or plate, so as to successively register with the marks or indicia 5 and by its position show at a glance how many yards have been measured, it being understood that these marks 5 are numbered from "1" upward, so that to ascertain how many yards have been measured it will only be necessary to note the number toward which the index-finger is pointing.

Fitting against the under side of the yardstick or plate and the inner flange thereof is a rack-bar 8, through the front end of which screw 6 extends, and clamped on said screw against the under side of the rack-bar by means of a nut 9 is a spring 10, which projects inward and bears frictionally against the under side of the yardstick, so as to guard against accidental movement of the rack-bar, the latter being supported by means of the angular portion 11 of a plate 12, secured by a screw or rivet 13 to the yardstick. When the rack-bar occupies its initial position, its first notch is disposed slightly forward of the end of the guide 11, and the index-finger occupies a position at the extreme rear end of slot 4, so as to show that no yards have been registered.

14 indicates a short longitudinal slot in the front end of the yardstick, and 15 a thumb-stud projecting down through said slot, the lower end of the thumb-stud being secured to the front end of the dog 16, fitting against the under side of the yardstick and held snugly in position by the guide-clip 17, secured to said yardstick by a screw or rivet 18. The rear end of the dog is provided with a ratchet-tooth 19 for successive engagement with the notches of the rack-bar, which notches of course should equal in number the division-marks 5.

20 indicates a light spring secured at one end to the toothed end of the dog and at the other to the screw or rivet 18, said spring holding the dog withdrawn from engagement with the rack-bar and the thumb-stud at the rear end of slot 14.

In practice the yardstick is secured upon and near the inner edge of the counter for the convenience of the salesman or invoicer, and where the yardstick is composed of two sections they are arranged end to end and so secured by small screws 21. Now when a customer orders, say, five yards of cloth the salesman with the bolt of cloth lying on the counter grasps the end and unrolls it, the cloth sliding through his other hand and over the yardstick until his right hand reaches the end of the yardstick, when he causes his thumb to strike and push the thumb-stud forward, this action imparting like movement to the dog, so that its tooth under the pressure of the spring in its resistance to longitudinal movement of the dog to the right enters the first notch of the rack-bar and moves the latter one step in order that the index-finger shall register one yard. The release of the thumb-stud permits spring 20 to return the dog to its original position. The salesman then grasps the cloth at the left-hand end of the yardstick and draws the cloth forward until he has again operated the thumb-stud, and thereby caused the dog to again move the rack-bar and the index-finger to register two yards, these actions being repeated until the five yards of cloth have been measured. The actions described with little practice become mechanical, and thus leave the salesman absolutely free to answer the questions of other customers regarding other goods without interfering with his measuring operation or confusing him to such an extent that he will have to remeasure the cloth, as he can tell at any time just how many yards have been measured off by reference to the position of the index-finger.

It will be obvious that the device will be found of great convenience in invoicing.

After the predetermined number of yards have been measured the operator places his finger or thumb on the index-finger and slides it back to its initial position, the spring 10 engaging the yardstick with sufficient pressure to arrest the rack-bar positively, when the pressure of the finger is removed, so that the latter if slid back forcibly cannot rebound forward when the rivet or screw strikes the rear end of slot 4.

While we prefer that the registering device shall be actually a part of the yardstick, it is obvious that the registering device may be supported from the yardstick or may be used in conjunction with headed tacks secured in the counter at suitable distances apart in lieu of a yardstick. It is equally obvious that instead of the register of the type shown a rotary register may be employed of any suitable or preferred construction, as the use of such register in conjunction with a measuring device of whatever character it may be will be the mechanical equivalent of the registering device shown and specifically described.

From the above description it will be apparent that we have produced a combined measuring and registering device which embodies the features of advantage enumerated as desirable in the statement of the object of invention and which will be found of great convenience in establishments where goods are measured in predetermined lengths.

Having thus described the invention, what we claim as new, and desire to secure by Letters Patent, is—

1. The combination with a measuring means, of a register comprising marks consecutively numbered, a slidable rack-bar, an index-finger movable with the rack-bar and adapted to register successively with said marks, a dog movable longitudinally and pivotally, and a spring adapted in resisting longitudinal movement of the dog to impart pivotal movement to said dog and cause it to engage the rack-bar.

2. The combination with a measuring means, of a register comprising marks consecutively numbered, a slidable rack-bar, an index-finger movable with the rack-bar and adapted to register successively with said marks, a dog movable longitudinally and pivotally, and a spring having an arm disposed longitudinally of and secured rigidly with relation to the measuring means and an arm disposed transversely of such means and attached to the dog to hold the latter yieldingly withdrawn from the rack-bar.

3. The combination with a measuring means, of a register comprising marks consecutively numbered, a slidable rack-bar, an index-finger movable with the rack-bar and adapted to register successively with said marks, a dog movable longitudinally and pivotally, a guide-clip to limit the pivotal movement of the dog from the rack-bar, and a spring adapted in resisting longitudinal movement of the dog to impart pivotal movement to said dog and cause it to engage the rack-bar.

4. The combination with a measuring means, of a register comprising marks consecutively numbered, a slidable rack-bar, an index-finger movable with the rack-bar and adapted to register successively with said marks, a dog movable longitudinally and pivotally, a spring adapted in resisting longitudinal movement of the dog to impart pivotal movement to said dog and cause it to engage the rack-bar, and means to hold the rack-bar against accidental movement when not being moved by the dog.

5. The combination with a measuring means, of a register comprising marks numbered consecutively, a slidable rack-bar suitably guided, a spring carried by the rack-bar and frictionally engaging the measuring means, a dog mounted slidably and pivotally on said measuring means, a spring holding said dog at the left-hand limit of its slidable movement and withdrawn from the path of the rack-bar, and a guide-clip secured to the measuring means and engaging said dog and limiting its pivotal movement away from the rack-bar.

6. The combination with a measuring-plate having a longitudinal slot and provided with consecutively-numbered marks contiguous to said slot, a slidable rack-bar mounted on said plate, a pin carried by said rack-bar and projecting through said slot, an index-finger secured to the pin and adapted to successively register with said marks, means to prevent accidental sliding movement of the rack-bar, a dog movable longitudinally and pivotally, and a spring adapted in resisting longitudinal movement of the dog to impart pivotal movement to said dog and cause it to engage the rack-bar.

7. The combination with a measuring-plate provided with parallel longitudinal slots and with consecutively-numbered marks alongside one of said slots, a longitudinally-slidable rack-bar mounted on said plate and provided with a pin projecting up through the slot contiguous to said marks, an index-finger carried by said pin and adapted to successively register with said marks, a dog mounted on said plate and provided with a thumb-stud projecting up through the other slot so as to move longitudinally and pivotally therein, a guide secured to said plate and engaging the dog and limiting the pivotal movement of the latter away from said rack-bar, and a spring secured to the dog and a point fixed with relation to the plate and resisting longitudinal movement of the dog and pivotal movement of the same toward the rack-bar.

In testimony whereof we affix our signatures in the presence of two witnesses.

JOHN BARRY.
MICHEAL L. SHAUGHNESSY.

Witnesses:
PETE HINTZ,
A. F. HATTEN.